Patented Mar. 26, 1940

2,195,225

UNITED STATES PATENT OFFICE 2,195,225

PROCESS FOR THE MANUFACTURE OF DRYING OIL FROM CASTOR OIL

Remmet Priester, Deventer, Netherlands, assignor to Naamlooze Vennootschap Industrieele Maatschappij Voorheen Noury & Van Der Lande, Deventer, Netherlands, a company of the Netherlands No Drawing. Application November 25, 1938, Serial No. 242,371. In the Netherlands December 18, 1937

8 Claims. (Cl. 260—398)

The invention relates to a process for the manufacture of drying oil from castor oil, by splitting off water from the ricinoleic acid radicals of the glyceride, in the presence of a catalyst.

There are already known several processes which, according to the abovementioned principle, are directed to the manufacture of a drying oil. Such a process is e. g. described in the German Patent No. 632,478 according to which the splitting off of water from castor oil is stimulated by adding bleaching earth. In the British Patent No. 317,391 sulphates, phosphates, and silicates and some neutral oxides are mentioned as catalysts. Besides in my United States patent application Ser. No. 181,468, filed December 23, 1937, sulphuric acid and persulphuric compounds are described as excellently active catalysts. Also the use of aromatic sulpho-compounds is known as e. g. naphthalene-sulphonic-acids. The conditions, under which according to the justmentioned processes the reaction takes place, are generally the same while the catalysts are added in quantities varying from 0.1 to a few percent.

Also the present invention more especially relates to the use of a particular class of catalysts. It has namely appeared that several aliphatic sulphocompounds, particularly the sulpho compounds of the lower aliphatic hydrocarbons, have a very special action in extremely small quantities. The remarkable feature of these substances is that addition in a quantity equal to the minimum quantity of the active substances known until now, i. e. of 0.1 percent by weight, does not lead to a favourable result, since the oil prepared in this way obtains a very dark colour, while also the other properties are bad. Probably for this reason attention has never been directed to the aliphatic sulpho-compounds. If, on the other hand, only an amount of 0.001 to 0.01% by weight is used, no discoloration worth mentioning occurs and also a drying oil of a good quality is obtained. The percentages of catalytic material mentioned above have reference to percentages by weight of the castor oil to be treated. At a temperature of 150° C. water starts to split off; the reaction takes place very quickly beween 180–200° C.; after heating to 250° C. this splitting off of water can be considered as finished. As very suitable catalysts may be mentioned the mono-, di-, tri- and polysulphonic acids of methane and its homologues, such as in particular methionic acid, $CH_2(SO_3H)_2$.

Further it was found that the aliphatic sulpho compounds have considerable hydrolytic properties so that the oil obtained shows a high acid number. Especially when the oil is treated to a standoil by heating it upwards of 250° C. a very sharp increase of the acid number occurs. At the same time, however, it has appeared very unexpectedly that the acid number may be corrected in a rather simple way. For this purpose, namely, a re-esterification is carried out in such a way that a small portion of the oil is heated to the temperature at which, contingently, one wants to prepare the standoil, after which the acid number of this portion is determined and according to this acid number the quantity of polyhydric-alcohol required in order to give the oil an acid number previously fixed, is determinded. As a matter of fact this process can also be applied without treating the oil to standoil.

The process according to the invention may be carried out under very divers reaction-conditions. One can carry out the heating of the castor oil according to the present invention at atmospheric pressure and pressures in excess of atmospheric pressure; however, it will be of special advantage to carry out the reaction under vacuum, as in this way the aqueous vapour and other volatile products formed can be easily removed. It may also be advantageous to pass through or over the oil inert gases such as carbon dioxide, nitrogen or e. g. sulphur dioxide, contingently steam, superheated or not. Usually the reaction is carried out whilst stirring. Further it will always be useful to remove the reaction water during the reaction. Finally it is recommendable to remove after the reaction has finished the most volatile products by means of a distillation with steam.

The following examples are given in illustration of the invention, without, however, limiting the invention to these examples:

Example I 500 g. of castor oil and 0.004% of its weight of methionic acid are heated whilst stirring and passing a stream of carbon dioxide through the mixture. At 150° C. water starts to split off and the reaction vessel may be connected with a cooler so that the water formed can be condensed in this way. During the reaction the temperature is slowly increased to 235° C. The velocity of the distillation and the total quantity of water which is distilled off are a measure for the progress of the reaction. After 4 hours about 23 cc. of water are distilled off. The reaction has then practically finished. The acid number of the oil thus prepared is 19.4, the viscosity 7.5 poises at 20° C., while the color of the oil has remained especially beautiful. Thereupon a sample test is made to determine the quantity of glycerol which is required in order to bring the acid number of the oil, after heating to standoil, to about 10. This quantity amounts to about 1.5% or 7.1 grams of glycerol. If, instead of glycerol, sorbite is used, the quantity is chosen somewhat larger, e. g. 2% by weight. With this quantity of polyhydric-alcohol the oil is mixed and heated for some hours (about 2-5 hours) at a temperature 180–225° C., until no more esterification water is formed, after which the temperature is increased to 270° C. in order to obtain a standoil of the viscosity desired, for example 30 poises. The re-esterification, as well as the preparation of the standoil, are carried out under vacuum, preferably below 100 mm. Hg-pressure. The colour of the oil thus obtained remains invariably bright yellow, the viscosity amounts to about 29.5 poises and the acid number to 10.7. After siccativation with the ordinary driers the oil dries very quickly; a dried film of this oil has an excellent water-resistance.

Example II

Castor oil is mixed with 0.01% of its weight of ethyl sulphonic acid and heated to 180° C. whilst stirring and whilst passing a stream of $CO_2$ through the liquid. The temperature is slowly increased to 235° C. whereby in 6 hours 54 cc. of water per kilogram of castor oil distill off. The reaction is finished when practically the theoretical quantity of water has distilled off. The oil thus obtained has a light yellow colour, a viscosity of 12 poises and an acid number of 15.8. After siccativation with 0.025% of lead, 0.015% of cobalt and 0.015% of manganese the drying time of a film of this oil is about equal to that of standoil. The water-resistance may be compared with that of wood oil (tung oil). For the preparation of a standoil the oil may be re-esterified with 12 grams of glycerol per kilogram of drying oil, after which the heating to standoil takes place. The viscosity is then 35 poises and the acid number 10.2.

Example III 500 parts by weight of castor oil are mixed with 0.005% of its weight of methane trisulphonic acid and heated under a vacuum of preferably below 100 mm. Hg-pressure whilst passing through steam. After heating for some hours (about 4 hours) at 180–250° C. the heating process is continued for 3 hours at a temperature of 270° C. in order to obtain a standoil. The final product has a viscosity of 35 poises, measured at 20° C., while the acid number amounts to 12. According to this process a re-esterification is not necessary, because the fatty acid formed is partially distilled off.

Example IV 1000 g. of bleached castor oil are heated with 0.002% of its weight of ethionic acid $$(CH_3.CH(SO_3H)_2)$$

to 180° C. The temperature is increased during 5 hours to 235° C. in which period about 48 cc. of water distill off. The heating process is carried out under a vacuum of preferably below 100 mm. Hg-pressure, while superheated steam is passed through the mixture. After the reaction has finished, a powerful current of steam is passed under vacuum through the mixture in order to remove the volatile products formed. In this way the acid number of the oil is reduced to such a degree that for the re-esterification a quantity of 0.75% of glycerol is sufficient and finally a standoil is obtained with an acid number of about 12. Instead of glycerol a corresponding quantity of sorbitol, pentaerythrite, or another polyhydric alcohol may be added. The viscosity of this standoil amounts to 37 poises.

I claim:

1. Process for the manufacture of a drying oil from castor oil which comprises heating it at a temperature of about 150–250° C. in the presence of a small amount of a sulpho compound of a lower aliphatic hydrocarbon.

2. Process for the manufacture of a drying oil from castor oil by splitting off water from the fatty acid radical of said oil, which comprises heating said oil at a temperature above 150° C. in the presence of 0.001 to 0.01% of a sulpho compound of a lower aliphatic hydrocarbon as a catalyst.

3. Process for the manufacture of a drying oil from castor oil which comprises heating it at a temperature of about 150–250° C. in the presence of 0.001 to 0.01% by weigh of methionic acid.

4. Process for the manufacture of a drying oil from castor oil which comprises heating it at a temperature of about 150–250° C. in the presence of 0.001 to 0.01% by weight of ethionic acid.

5. Process for the manufacture of a drying oil from castor oil by catalytically splitting off water from the fatty acid radical of said oil, which comprises heating said oil at a temperature of above 150° C. under a vacuum of preferably below 100 mm. of Hg-pressure in the presence of a small amount of a sulpho compound of a lower aliphatic hydrocarbon effective as a catalyst.

6. Process for the manufacture of a drying oil from castor oil which comprises heating it at a temperature of about 150–250° C. in the presence of a small amount of a sulpho compound of a lower aliphatic hydrocarbon with the added step of reducing the acid number of the product obtained by esterification with a polyhydric alcohol.

7. Process for the manufacture of a drying oil from castor oil by spitting off water from the fatty acid radical of said oil, which process comprises heating said oil at a temperature above 150° C. in the presence of a small amount of a sulpho compound of a lower aliphatic hydrocarbon with the added step of reducing the acid number of the product obtained with a predetermined quantity of an alcohol to produce a final product of predetermined acid number.

8. Process for the manufacture of a drying oil from castor oil which comprises heating it at a temperature of above 150° C. in the presence of a small amount of a sulpho compound of a lower aliphatic hydrocarbon with the added step of passing a powerful current of steam under vacuum through the product obtained in order to remove the volatile products formed.

REMMET PRIESTER.